Patented Oct. 31, 1944

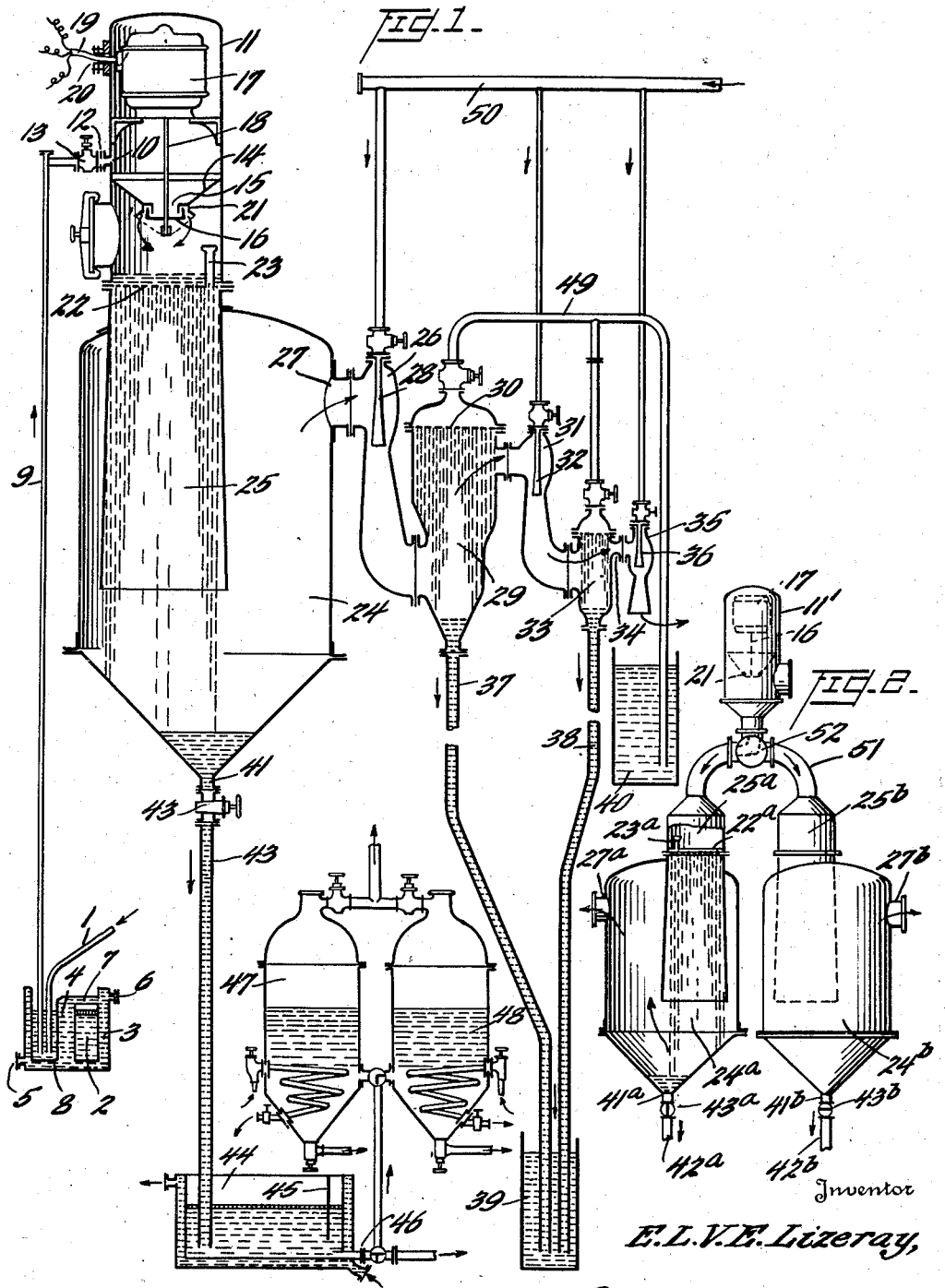

2,361,695

UNITED STATES PATENT OFFICE 2,361,695

METHOD FOR THE FERMENTATIONLESS CONSERVATION OF FRUIT-, GRAPE-, AND GREENS-JUICES

Ernest Léon Victor Emile Lizeray, Paris, France; vested in the Alien Property Custodian Application August 14, 1940, Serial No. 352,622
In France July 1, 1939

5 Claims. (Cl. 99—155)

The present invention relates to a method and an apparatus for the fermentationless conservation of fruit-, grape- and greens-juices.

As a well known disadvantage, conserved fruit-, grape- and greens-juices as usually on the market have another flavor and odor than the freshly squeezed juices. However, it has not been possible hitherto to conserve these juices and to bottle them without previously treating them in a definite manner. The known proceedings hitherto used result in an alteration of the flavor and odor of the juice, owing to the fact that during the treatment with yeast as soon as symptoms of a fermentation turn up, the first chemical reactions caused by the cells of yeast modify certain original combinations of the juice, causing in this manner a detrimental alteration of the flavor and odor of the freshly squeezed juice.

It is further to be noted that during the prosecution of certain proceedings, either before the concentration or the bottling, or before the conveying of the juices to conserving tanks, in which they are to be preserved against deterioration by cooling or carbonic acid under pressure—a definite period of time elapses during which the juices are undergoing a fermentation, as for example at the clarifying, the filtration and sometimes at the ultra-filtration of the juices.

In several countries, it is also permitted to use chemicals in order to prevent formation of iron or copper containing precipitations and to effectuate the clarification of the juices, but such chemicals have a destroying effect to the sensitive vitamins of the juices. Other chemicals such as benzoates, the use of which is permitted in several countries, have the typical flavor of pharmaceutical preparations.

By using sulphuric acid and potassium metabisulphite which are also permitted in several countries, the vitamins are equally destroyed and a disagreeable sulphur smell is produced, since these combinations when brought into the juice, are transforming themselves partly into sulphuric acid and combine with a part of the free sulphur dioxide or with that having been freed by the natural acids of the juice to a combination impossible to be destroyed merely by heat application and decomposition by boiling is but very difficult, so that a subsequent desulphuration is rendered very difficult. The combination formed in this manner further undergoes in presence of the organic substances of the juice and after certain time a decomposition thus producing free sulphuretted hydrogen with its known nauseous odor.

Even with those juices in which fermentation could be prevented, it must sometimes be stated that when growing old the flavor and odor of the same is altered. Particularly the juices of fruits from the south, for example oranges, are getting after a relatively short time a mouldy flavor and a slight odor of turpentine.

The juices generally eager for oxidation and combinations of which are partly very liable to oxidation, absorb oxygen or are undergoing alterations during the prosecuttion of certain treatments or during the heating required for the concentration and stabilization of the juices, which alterations are producing a partial oxidation. These alterations result in the production of a flavor of stewed or baked fruit and of a cooking odor and—particularly in the fruits from the south,—the creation of a slight turpentine odor. The consumer notices this as disagreeable and will not care any more for conserved juices.

The small quantities of stewed fruit and of pulp present in the squeezed juice contain a part of the juice, and with some fruits very savory components. In fruits from the south, these components also contain essence-oils which are very liable to produce further alterations of the juice as to flavor and odor.

The usual proceedings for the partial separation of these pulp residues etc. requires time and if the juice is not absolutely prevented from the access of air during this time and if the juice is not enclosed in a vessel of approximately an absolute vacuum, it is going to oxidize more or less. As far as juice of fruits from the south is concerned, it will thus become stale and dead and will loose the vivacious, pregnant flavor of the freshly squeezed juice.

The inventor has found a number of new fundamental statements which though new are not in contradiction with the fundamental principles fixed by Pasteur that on the one hand the yeast is developed as a result of a large introduction of oxygen, producing but very small quantities of alcohol and carbonic acid and that on the other hand the yeast under normal conditions transforms the sugar almost completely in carbonic acid and alcohol without increasing itself in quantity.

The aforesaid statements are as follows:

1. Fermentation once started accelerates itself, if the liquid is heated to a suitable temperature and contains the substances which are indispensable for the formation of the yeast cells (orthophosphoric acid, nitrogen combinations enabling an assimilation) and which are essential for their biologic functions (sugar and some acid), according to a definite principle. This rapid progression of the fermentation is a result of the increase of the yeast cells by splitting owing to increasing of the temperature close to the optimum as well as due to secretion of a substance caused by the yeast cells, which substance increases the capacity of fermentation of the yeast cells and their vitality and ability of respiration. From this it follows that it is much more difficult to stop a fermentation once initiated than to prevent it.

2. When the liquid in which the yeast cells have infiltrated is absolutely kept out of contact with oxygen, the following will happen: After having consumed their own quantity of oxygen, produced the small quantity of alcohol and carbonic dioxide corresponding to their ability and duration of life, and having developed themselves more or less weakly (weakly in consequence of the lack of oxygen), the yeast cells are producing branch cells which apparently have forgotten their descent wholly or partly and seem to be no more able to produce alcohol and carbonic dioxide. However this does not prevent the liquid, when coming in contact with fresh air to undergo an active fermentation according to its nature and to the given conditions of temperature.

3. If the juice immediately after squeezing is rapidly cooled down, say close to the freezing point, i. e. to 28.4° Fahrenheit, it results not only a deadening of the yeast cells contained in the juice, but there occurs also a partial precipitation of certain combinations which release by splitting the separation of other elements and consequently initiates clarifying.

4. When the juice is completely freed from oxygen, completely prevented from all possibility of oxidation and simultaneously is sufficiently cooled, formation of the aforesaid alterations of flavor and odor is no longer to be feared, and they will not appear neither at the moment nor later, nor under the influence of a moderate heating of a relatively short duration.

5. When a liquid containing absorbed gases is subjected to vacuum and when this vacuum corresponds to the absolute pressure under which the liquid at the temperature which it possesses begins to boil, the gases absorbed by the liquid are expelled under the condition that the vapors produced by boiling are continually sucked off. The temperature of the liquid drops under the influence of the evaporation which the liquid is subjected to.

The result would not be the same when the produced vapors were not continually sucked off, since when the pressure of the vapors reaches the absolute pressure under which the liquid at the prevailing temperature begins to boil boiling of the liquid and consequently expelling of the gases would cease.

6. When at a temperature somewhat below that at which the yeast cells are destroyed the liquid is subjected to a vacuum that corresponds to the absolute pressure under which the liquid at the prevailing temperature begins to boil, it may be noted that the yeast cells resist this temperature as effectively as when subjected to it at standard barometrical height of 30 inches of mercury. In consequence, the time of heating may be shortened and the temperature of sterilization reduced. Owing to the complete deoxidation of the juice in combination with cooling down to solidification of the liquid, the use of antiseptics, of anti-fermenting means and of chemical substances which are to help clarifying or to retard fermentation, may be dispensed with.

It is, therefore, no longer to be feared that immediately or later on alterations of flavor and odor may take place. There is further no more danger of slow oxidation on storing the juices in tanks kept cool or under carbonic dioxide (the carbonic dioxide is not able, even when it may paralyze the yeast cells, to prevent the action of the dissolved oxygen nor the formation of a cooking or baking flavor which is produced by the cooking of the juice required for the concentration or bottle-stabilization of the juice).

The complete expulsion of the absorbed oxygen and the elimination of any possibility of oxidation hinders the development of the yeast cells and the few branch yeast cells which may be produced, are no longer to be feared. The aforesaid temperature below the freezing-point should prevail as long as required for preventing fermentation during bottling and an eventual stabilization (of turbid juices).

When juices are to be furnished absolutely clear, requiring clarifying, filtration and even ultra-filtration, it is easy to prevent them from warming above the very low temperature to which they are brought.

The method based on the aforesaid statements and in accordance with the present invention consists of atomizing colloidally and of homogenizing the juice to be treated, then dispersing it under a high vacuum, then dropping the temperature of the juice below the freezing point by boiling and simultaneous evaporation until complete expulsion of the gases, that is, complete extraction of the oxygen, the produced vapors as well as the gases absorbed by the juice being continually sucked off by vacuum, and immediately filling the produced liquid in receptacles for storage or delivery.

The colloidal atomizing and homogenizing of the juice is preferably effected in the vacuum also, and all aforesaid operations are advantageously carried out in the same evacuated receptacle. After the homogenizing and dispersion of the juice, the extraction of the oxygen physically dissolved in the juice may be effectuated instantly whilst the temperature of the juice is simultaneously and in a fraction of a second lowered below the freezing point, viz: down to 28.4° Fahrenheit, owing to boiling and the resulting evaporation under an absolute pressure of approximately $\frac{1}{32}''$ of mercury which head corresponds to the pressure of water-steam at a temperature of 28.4° Fahrenheit. This intense cooling causes the precipitation of certain components whereby the clarifying of the juice is effectuated.

It is not absolutely necessary that the colloidal trituration and the homogenizing are carried out in the same apparatus and under approximately an absolute vacuum, but this is preferred in order to prevent that on the one hand the juice which is exposed during a relatively long period of time to the air oxidizes, and on the other hand a loss of energy occurs by heating the juice in contact with air. The simultaneousness of the colloidal trituration, of the extraction of the oxygen and of the cooling down to the freezing point, for example, to 28.4° Fahrenheit, and this during the same fraction of a second results in an obvious advantage.

The colloidal trituration and the intense homogenizing make all stewed fruit and cell particles disappear and eliminates the inconveniences which may be associated to the presence of such particles, for example, the action of yeast cells which may be hidden in such particles of stewed fruit, the danger of carmelisation resulting from a subsequent heating and also the possibility of small quantities of juice being retained, juice which might thus escape the action of the deoxidizing processes.

A preferred manner of carrying out the method according to the invention is described hereinafter:

The introduced juice is first subjected to an intense colloidal trituration and homogenizing which is carried out so to say in an absolute vacuum of $\frac{5}{32}''$ of mercury corresponding to a boiling temperature of the juice of 28.4° Fahrenheit. After that, the juice is dispersed past through a strainer under the action of its own weight. Then is effectuated the complete extraction of the oxygen absorbed in the juice by extracting the water-steam produced by boiling in absolute vacuum, the produced steam being continually sucked off. The cooling of the juice close to the freezing point is obtained by evaporating a portion of the water contained in the juice boiling it under vacuum. Clarification of the juice is started by the beginning of the precipitation of certain components caused by the cooling in the vacuum, and consequently in absence of air.

All these operations can be carried out in the same receptacle of the apparatus and this in a rapid succession of fractions of a second.

Juices which are to be furnished in a clear state, are heated up to from 122–140° Fahrenheit in order to obtain a preliminary clarification. Then the juices are filtered, bottled under vacuum and sterilized.

The apparatus according to the invention for carrying out the aforesaid method comprises in combination means, for example, a mill for the colloidal atomization and homogenizing of the juice by means of an intensive trituration of the stewed fruit and cell particles arranged in a hermetically sealed receptacle which also contains a dispersing device with the necessary openings and connecting-sockets and to which is connected a device for generating a high, so to say, absolute vacuum which enables the juice to be boiled at a very low temperature owing to continually sucking off the produced vapors from the said receptacle.

A preferred embodiment of the apparatus according to the invention is illustrated in the annexed drawing, of which Fig. 1 shows a sectional elevation, while Fig. 2 shows a modification of a fragment of the apparatus in elevation and partial section.

In the shown apparatus, the juice coming from the not shown press of a known kind and design and freed from kernels passes through the pipe 1 into the collector 2. This collector vessel 2 has a jacket 3 and a central cavity 4 filled with a cooling liquid which is introduced through the socket 5 and drained through the socket 6. For draining the cooling liquid, the central cavity 4 is connected to the side wall of the jacket by a pipe 7.

In the collector 2 is immersed the end of the suction pipe 9 which connects the same to the inlet-socket 10 of the receptacle 11. In the pipeline 9 is inserted a valve 13 for the admission or cutting-off of the juice, and adjacent to the said valve is provided a diaphragm 12 with a central aperture for the regulation to a maximum of the quantity of liquid admitted.

The inlet-socket 10 is arranged on the side wall of the receptacle 11 above a funnel 14 closely connected to the cylindrical wall of the receptacle and which conveys the introduced juice to the colloidal mill which is to effectuate a colloidal trituration and homogenizing of the juice to be treated. Said mill is provided with a rotor 16 directly fitted on the shaft 18 of an electrical motor 17 located in the upper part of the receptacle 11, so that it is rotating at high speed.

Current is fed to the motor 17 by means of a cable 19 introduced through the wall of the receptacle 11 by means of an airtight stuffing-box 20.

The rotor of said mill may be ribbed or otherwise corrugated on its circumferential surface and is preferably shaped to a truncated form in order to permit adjustment of the air gap between the rotor 16 and the stationary milling crown 21. The rotor 16, therefore, can be approached to the stationary milling crown 21 corrugated in a similar manner, so as to reduce the air gap to an extremely small extent thereby permitting trituration to a maximum of fineness and a very extreme homogenization.

For the dispersion of the juice draining from the colloidal mill, in the receptacle 11 is provided a strainer 22 of stainless steel or enamelled iron sheet connected at its border to the wall of the receptacle 11 and fitted with an upright pipe 23. Number and size of the strainer openings are to be dimensioned in such a way as to allow the juice to collect above said strainer to a height of an inch. The passage through these perforations must be in correspondence to the hourly output of the apparatus as controlled by the aperture of the diaphragm 12 and which is in accordance with the generated vacuum.

To the cylindrical receptacle 11 is joined to its lower border a truncated shaped tube 25 slightly diverging downwards and immersed in a larger receptacle 24 in the cover of which it is inserted eccentrically, so that the apparatus is fitted with two chambers separated by the strainer 22. In order to obtain an equilibrium of pressure, the two chambers are interconnected to one another by the tube 23 emerging from the level of liquid above the strainer 22. The parts 11, 25 and 24 of the apparatus are made of iron sheet enamelled on the inside in order to prevent the development of a metallic flavor.

Diametrically opposed to the tube 25 is located at the highest point of the side wall of the receptacle 24 a large out-let opening 27 through which the gases and vapors generated during the boiling of the juice in the vacuum may escape. To this opening is connected the vacuum generating device the design of which is as follows:

For generating the vacuum, a steam ejector 28 is provided connected to the steam pipe line 50, said ejector drawing off the gases and vapors of the receptacle 24 and conveying them to a condenser 29. The latter has a vessel in which is inserted a strainer 30 for the distribution of the introduced water.

To the condenser 29 is connected a further ejector 32 for extracting the gases contained in the juice and the condensed water. The ejector 32 conveys the drained gases into a second condenser 33 of a similar but smaller design as the aforesaid condenser.

A third ejector 36 connected to the outlet of the condenser 33 draws the gases out of the said condenser and exhausts them to the air.

To the two aforesaid condensers 29 and 33 are connected water-pipes 37 and 38 conveying the condensed water into a water reservoir 39. Said two water-pipes 37 and 38 must have a length corresponding to the minimum of barometrical pressure.

The feeding of water to the two condensers 29 and 33 is effectuated by means of a pipe 49 branched off the water reservoir 40 and from which the water is drawn into the condensers by vacuum.

On the lower end of the conical bottom of the receptacle 24 is arranged an outlet-socket 41, through which the juice drains off through a cock 43 and the pipe 42 and enters the juice receptacle 44. This pipe must be somewhat shorter than required by the barometrical height.

The juice reservoir 44 comprises a separating wall 45 and at the bottom a connecting socket for the juice drain pipe 46 to carry on the treated juice. This may be conveyed either right into a bottling machine or into two pasteurizing apparatuses 47 and 28 known per se which may be taken in use alternatingly. Said pasteurizing apparatuses are connected to the vacuum and may be used as storing receptacles when pasteurizing is not desired.

Should the local conditions not allow the required height of the described apparatus, pumps may be employed for drawing off of juice and water.

Instead of the described strainer 22, another dispersion device could be provided, for example, tangential- or vertical spraying nozzles of a known design which disperse the liquid in a spray or rain by means of its velocity.

The manner of operation of the aforedescribed apparatus for carrying out the method according to the invention is as described hereinafter:

When starting the apparatus, care should be taken that the steam pressure is regulated by means of a steam regulator and a water-separator inserted in order to keep the introduced vapor dry. Further must the water-pipings 37 and 38 be filled with water and the pipes 9 and 42 with juice. It is further important that the introduced juices are fully free of impurities.

Now, the steam valves of the ejectors 36, 32 and 28 are opened slowly and one after the other. The vacuum generated by the two condensers 29 and 33 reduces the pressure to about $\tfrac{1}{32}''$ of mercury.

Then the valve 13 of the juice-inlet is opened and the driving-motor 17 of the colloidal-mill started. The juice is triturated and homogenized in said mill, passes the strainer 22 and drops under its own weight as a rain into the tube 25 where each drop is brought to boiling in the vacuum prevailing in the receptacles 11 and 24, thereby producing on the one hand a cooling of the juice and on the other hand the expulsion of the gases and vapors contained in the juice which are immediately and continually drawn off through the opening 27.

The cooled juice freed from the gases leaves the receptacle 24 past the outlet 41 and is conveyed through the pipe 42 into the juice reservoir 44 from which it may be drawn off for further use while the gases and vapors sucked off at 27 pass the two condensers 29 and 33.

It is advisable to pour on the surface of the juice in the open reservoir 44 a thin layer of oil in order to prevent all contact of the juice with the air. When the juice is circulating in this reservoir, the essential oils which have been freed by the effect of the trituration and homogenizing in the colloidal mill, may mix themselves with said layer of oil.

The collector 2 serves as a storing receptacle for the treated juice and it is not to be feared that the temperature of the treated juice is influenced by variations of the level of liquid in said collector.

Continuous operation when carrying out the aforedescribed method is not absolutely necessary and provisions could be taken for an intermittent operation of the boiling and evaporating process. An arrangement of this kind is illustrated in Fig. 2 of the drawing. In this arrangement, the lower end of the receptacle 11' enclosing the colloidal mill 16/21 with its driving motor 17 as aforedescribed is connected by means of a two-way cock 52 to a bifurcated pipe 51 which conveys the triturated and homogenized juice into the two dispersing apparatus which may be taken alternatingly in use. Each dispersing apparatus comprises a receptacle 25a or 25b respectively with a truncated tube as aforedescribed and enclosing a strainer 22a with a tube for the equalizing of pressure in the two chambers. The truncated tube immerges into the receptacle 24a or 24b respectively as aforedescribed forming thus a device with two chambers of vacuum interconnected by the tube 23a. From the outlet 41a or 41b respectively at the bottom of the receptacle 24a or 24b respectively, the collected juice is conveyed off through the valve 43a or 43b respectively and the pipe 42a or 42b respectively, while the extracted vapors and gases of the juice may be sucked off at the outlet opening 27a or 27b respectively and conveyed to the condensing apparatus connected to the outlet openings 27a and 27b respectively as aforedescribed. The two devices 25a/24a and 25b/24b may be taken alternatingly in use by means of the two-way cock 52 producing thus an intermittent dispersion and extraction process. For the remaining part, the operation as well as the apparatus are completely corresponding to the aforedescribed operation and apparatus.

When a preliminary cooling of the juices is intended, the apparatus producing the vacuum and the refrigeration may be used for cooling the cooling liquid.

It is to be understood that the present invention is not to be limited to the exact details of the method and construction shown and described, but changes could be made within the spirit and scope of the invention.

Having thus described my invention, what I claim as new and desire to secure by Letters Patent is:

1. A method for the fermentationless conservation of fruit-, grape- and vegetable-juices, which comprises colloidally atomizing and homogenizing the juice to be treated, dispersing the resultant homogenized product under a high vacuum, simultaneously boiling and evaporating the dispersed product under a high vacuum until gases present are completely expelled therefrom, whereby the temperature of the product is reduced substantially to its freezing point, continually removing vapors and gases evolved during the aforesaid simultaneous boiling and evaporating, and immediately filling the resultant liquid into receptacles.

2. The method recited in claim 1, the colloidal atomizing and homogenizing being effected by trituration.

3. The method recited in claim 1, the aforesaid vacuum being approximately $\tfrac{5}{32}''$ of mercury, whereby the temperature of the product is reduced to about 28.4° F.

4. The method recited in claim 1, the dispersing of the homogenized product being effected by allowing it to drop by gravity through a dispersing zone.

5. The method recited in claim 1, the filling into receptacles being effected under vacuum, and sterilizing the filled receptacles.

ERNEST LÉON VICTOR EMILE LIZERAY.